United States Patent [19]
Rafter

[11] Patent Number: 6,090,437
[45] Date of Patent: Jul. 18, 2000

[54] FLOOR REPAIR METHOD

[76] Inventor: Thomas Rafter, 144 Emporia Ct., Valley Center, Kans. 67147

[21] Appl. No.: 09/196,209

[22] Filed: Nov. 20, 1998

[51] Int. Cl.[7] .................................................. B32B 35/00
[52] U.S. Cl. .................... 427/140; 427/261; 427/265; 427/266; 427/189; 427/199; 427/203; 427/204; 427/290
[58] Field of Search ................................. 427/140, 290, 427/296, 261, 265, 266, 407.1, 412, 412.1, 189, 199, 203, 204, 369, 359

[56] References Cited

U.S. PATENT DOCUMENTS

| | | | |
|---|---|---|---|
| 4,510,001 | 4/1985 | Speer | 427/140 |
| 5,474,804 | 12/1995 | Kubie | 427/202 |

*Primary Examiner*—Janyce Bell
*Attorney, Agent, or Firm*—Kenneth Jack; Davis & Jack, L.L.C.

[57] ABSTRACT

A repair method for repairing a floor, the floor consisting of a cover stratum and a base stratum, the cover stratum having an upper surface and a lower surface, the base stratum having an upper surface, the lower surface of the cover stratum being fixedly attached to the upper surface of the base stratum, the cover stratum having a damaged area, the damaged area consisting of an aperture having an upper and a lower end, the aperture extending from the upper surface of the cover stratum to the lower surface of the cover stratum, the repair method comprising the steps of painting a section of the upper surface of the base stratum, the section painted spanning across the lower end of the aperture; pouring filler into the aperture; and, pouring adhesive into the filler.

21 Claims, 6 Drawing Sheets

FLOOR REPAIR METHOD

FIELD OF THE INVENTION

This invention relates to floor repair. Particularly, this invention relates to repair of damaged linoleum or vinyl floors.

BACKGROUND OF THE INVENTION

Floors having a covering stratum of linoleum or vinyl are commonly subject to damage in the form of marring, scuffing, burning, tearing, or punctures. A known method of repairing such damage is to cut away the damaged section, and to glue in its place a substitute section of undamaged vinyl or linoleum flooring. A drawback or deficiency of such repair method results from difficulty in obtaining a linoleum or vinyl floor patch having matching color and pattern. Another drawback or deficiency of such repair method is that it leaves an unsightly seam around the patch.

An alternate repair method utilized to overcome some of the deficiencies of the above described linoleum floor repair method comprises the steps of cutting away a damaged area of a linoleum or vinyl floor, pouring a filler material such as powdered calcium carbonate or sodium bicarbonate into the void left by the removed section, pouring a cyanoacrylate ester based adhesive into the filler, and allowing the cyanoacrylate ester adhesive/filler mixture to harden. A drawback or deficiency of such method results from the facts that the hardened cyanoacrylate ester/filler mixture typically is translucent while linoleum or vinyl floor underlayment typically is dark in color; contrasting with the typically light coloration of modern kitchen and bathroom floors. Such color contrast causes the hardened translucent patch to appear as an unsightly darkened spot. Another drawback or deficiency of such method is that the cyanoacrylate ester/filler mixture often hardens slowly due to lack of water moisture as a hardening catalyst. The instant inventive method solves the drawbacks and deficiencies of the latter repair method described above by coating the surfaces of the void left by removal of linoleum or vinyl with a preferably light colored water based paint. Such painting eliminates the dark spot effect described above and, upon introduction of cyanoacrylate ester adhesive prior to complete drying, reduces drying and hardening time.

PRIOR ART PATENTS

U.S. Pat. No. 5,622,661 issued Apr. 22, 1997, to Cederstrom discloses a method of treating of layered laminated plastic objects.

U.S. Pat. No. 4,948,443 issued Aug. 14, 1990, to Speer discloses a plastic laminate repair method.

U.S. Pat. No. 4,824,500 issued Apr. 25, 1989, to White, et al., discloses a method for repairing damaged composite articles.

U.S. Pat. No. 4,526,636 issued Jul. 2, 1985, to Mader discloses a method of repairing breaks and sheet material.

U.S. Pat. No. 4,409,270 issued Oct. 11, 1983, to Faber, et al., discloses a method for repairing glass fiber reinforced plastic parts.

U.S. Pat. No. 4,260,439 issued Apr. 7, 1981, to Speer discloses a method for repairing plastic materials.

U.S. Pat. No. 4,086,113 issued Apr. 25, 1978, to Cataffo, et al., discloses a method for repairing damaged vinyl sheets.

None of the above disclosed patents teach, disclose or describe the novel, inventive, useful, and unique aspects, elements and features of the present inventive floor repair method.

BRIEF SUMMARY OF THE INVENTION

In performing the instant inventive floor repair method, the first step performed necessarily varies with the nature of the damage to the linoleum or vinyl floor to be repaired. Where the damage to the linoleum or vinyl floor is in the nature of a scuff, cigarette burn or the like, a linoleum knife or other utility knife is preferably utilized to draw a lance cut in the linoleum or vinyl floor around the damaged area, creating a hole approximating the shape and size of the damaged area. Preferably, the edges of the hole are inwardly beveled at approximately 45 degrees for enhancement of adhesion contact area. Alternately, where the damaged area is in the nature of a tear, a hole, a puncture or other undesirable aperture exposing the underlayment stratum, the linoleum knife or utility knife is preferably utilized to trim the edges of the aperture at the desireable 45 degree bevel. In either case, after the step of utilizing the linoleum knife or utility knife to cut or trim, the damaged area is transformed into a shallow void extending through the vinyl or linoleum stratum, the upper surface of the underlayment stratum serving as a floor spanning across the lower end of void.

In the second step of the present inventive repair method, it is preferable that a rough grade of sand paper be utilized to sand the floor and beveled edges of the void, scoring such surfaces for enhanced adhesion. After such sanding, it is preferable that all loose sanding dust or debris be removed from the area by vacuuming or sweeping.

After the void is sanded, and after sanding dust is removed, the side walls and floor of the void are painted. Preferably, the paint selected is water-based so that water moisture within the paint may react as a hardening catalyst for a cyanoacrylate ester based adhesive subsequently introduced into the void. Also preferably, the paint is light in color preventing the generally dark appearance of the upper surface of the underlayment stratum from being visible through the translucent patch. Suitable paints are water based tempera paint and water based latex paint. Where sufficient atmospheric moisture is a available as a hardening catalyst, light colored non-water based paints such as enamel may suitably be utilized.

Prior to complete drying of the paint within the void, a powdered filler material is poured into the void, filling the void. Preferably, the filler material is of a type which is non-reactive with and is insoluble in cyanoacrylate ester based adhesives. Preferable filler materials are sodium bicarbonate powder, calcium carbonate, and silica powder. A fourth suitable filler material is corn starch powder. After the powdered filler material is poured into the void, filling the void, the filler material is preferably troweled with the straight edge of a trowel to form an upper surface of the filler material which is co-extensive with the upper surface of the linoleum or vinyl stratum.

After leveling of the filler material, a cyanoacrylate ester based adhesive is preferably poured into the filler material until the filler material is completely saturated. Preferably, such adhesive is either ethyl or methyl based. Also preferably, such adhesive has a viscosity between 0.5 and 250 centistokes. The cyanoacrylate ester adhesive/filler material mixture will harden within approximately ten minutes, provided that such hardening is catalyzed by sufficient water moisture within the partially dried water based paint, or within the atmosphere.

As a final step of the present inventive floor repair method, a fine grade of sandpaper is preferably utilized to sand smooth the upper surface of the patch. While the patch created by the present inventive floor repair method is translucent, the patch will not appear unsightly because the light colored paint underlying the patch causes the patch to appear as a lightened area rather than an unsightly dark spot.

Accordingly, it is an object of the present invention to provide a method of preparing damaged areas of a linoleum or vinyl floor.

It is a further object of the present invention to provide such a method wherein the repair is prevented from appearing as an unsightly dark spot.

It is a further object of the present invention to provide such a method which hastens drying and hardening through introduction of additional water moisture.

It is a further object of the present invention to provide such a method providing cost economy and efficiency in time utilization.

Other and further objects, benefits, and advantages of the present invention will become known to those skilled in the art upon review of the Detailed Description and upon review of the appended drawings.

DETAILED DESCRIPTION OF THE PREFERRED METHOD STEP SEQUENCES

Figure 1:
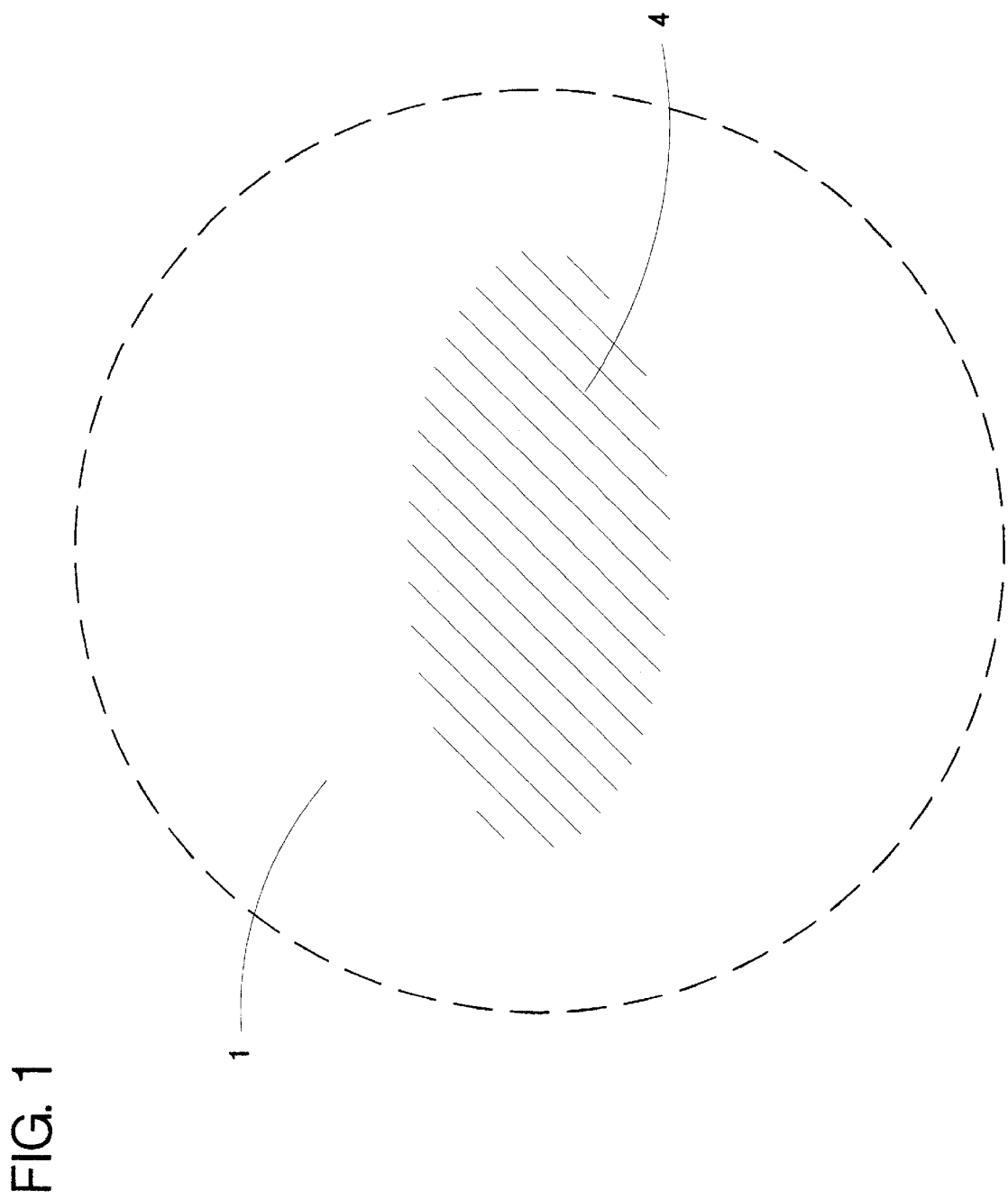
FIG. 1 depicts a vinyl or linoleum floor area having a cigarette burn.
Figure 3:
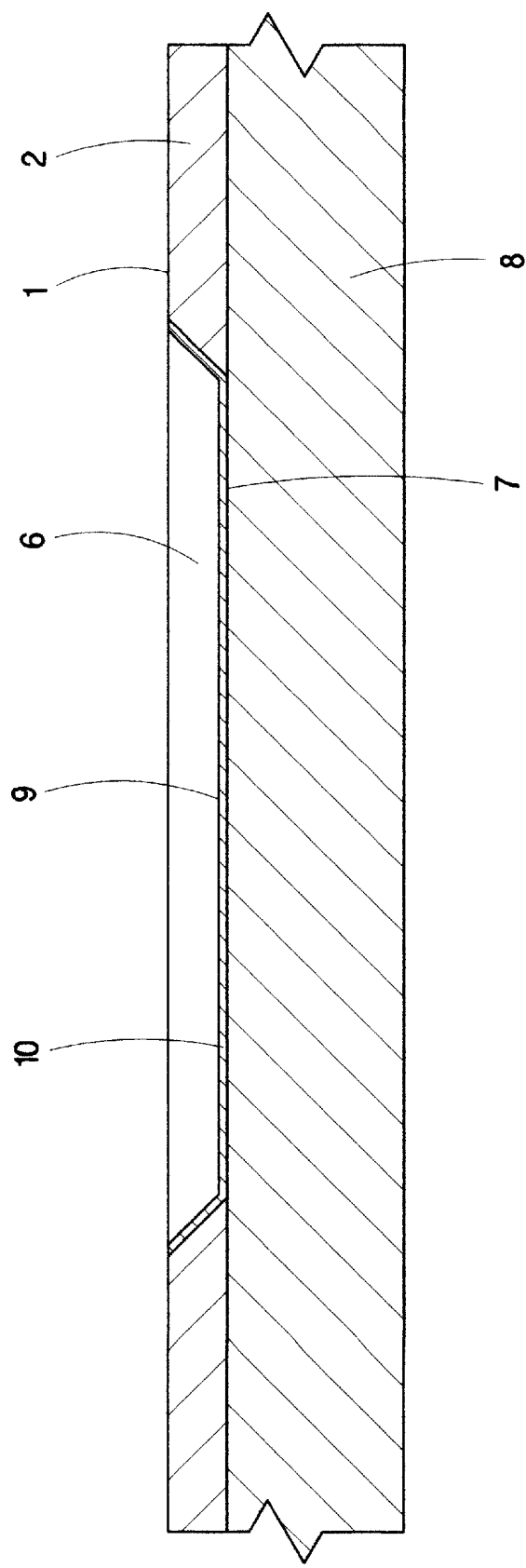
FIG. 3 is a sectional view of FIG. 2.

Referring simultaneously to FIGS. 1 and 3, Reference Numeral 1 designates an upper surface of a section of floor covering stratum 2, typically comprising vinyl or linoleum. Typically, such a vinyl or linoleum floor stratum 2 is adhesively applied to an underlayment 8 which serves as a base stratum. Referring to FIG. 1, a cigarette burn 4 represents one of several potential types of damage to the surface 1 of the, referring to FIG. 3, vinyl or linoleum cover stratum 2.

Figure 2:
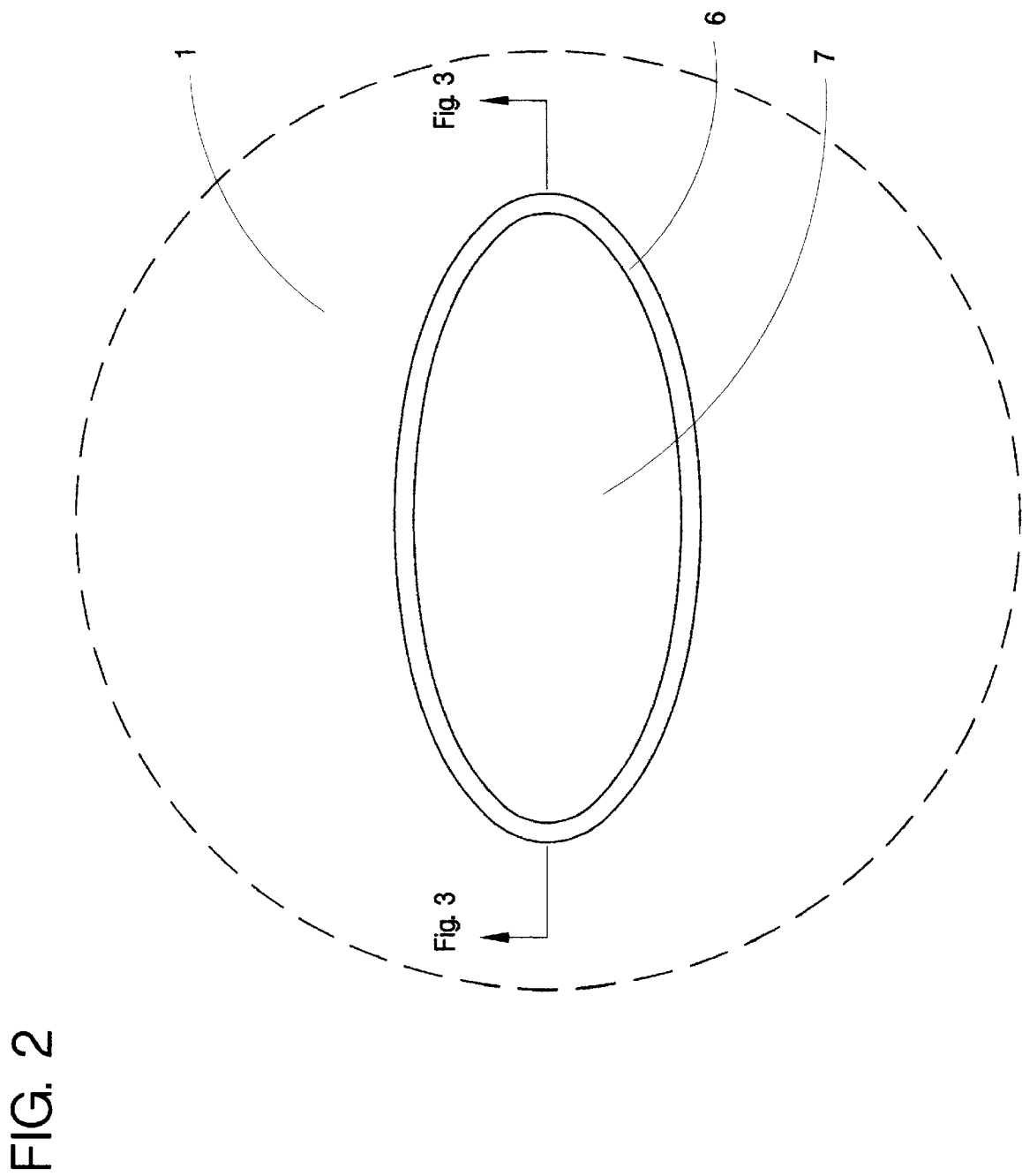
FIG. 2 depicts the vinyl or linoleum floor area depicted in FIG. 1 after removal of the burned area.

Referring simultaneously to FIGS. 1, 2, and 3, a linoleum knife or other utility knife is preferably utilized to cut away the damaged cigarette burn area 4. Preferably, the utility knife is tilted at a 45 degree angle, leaving an inwardly beveled wall 6. Such inwardly beveled wall 6 provides additional surface contact area for enhanced adhesion of adhesive saturated filler material.

Where the damaged area is in the form of a hole, tear, or other undesirable aperture, the linoleum knife is alternately used to trim the edges of such aperture at the desired 45 degree bevel.

Referring simultaneously to FIGS. 2 and 3, upon completion of the trimming or cutting step, as the case may be, the upper surface 7 of the underlayment stratum 8 is exposed, such upper surface 7 serving as a floor spanning across the lower end of the void or depression formed in said trimming or cutting step. Typically, the upper surface 7 of the underlayment stratum 8 is dark in color; while typically, the upper surface 1 of the vinyl or linoleum stratum 2 has a contrasting light coloration. Preferably, a rough grade of sandpaper is utilized to sand the upper surface 7 of the underlayment stratum 8 and to sand the beveled walls 6, scoring such surfaces for enhanced adhesion. After the sanding step, sanding dust and other debris is preferably removed through the use of a vacuum cleaner or by sweeping with a brush.

Referring to FIG. 3, after performance of said dust and debris removal step, the beveled side walls 6 and the upper surface 7 of the underlayment stratum 8 are painted with a layer of paint 10. Preferably, the paint 10 is light in color and is a water based paint. Suitable paints are water based white tempera paint and water based white latex paint. Where sufficient atmospheric moisture exist, light colored enamel paint may suitably be utilized. The light or white coloration of the paint is desireable so that the upper surface 9 of the paint 10 masks the typically dark coloration of the upper surface 7 of the underlayment stratum 8. Utilization of a water based paint is preferable in most circumstances because residual moisture within the paint serves as a catalyst for hardening of cyanoacrylate ester adhesives.

Figure 4:
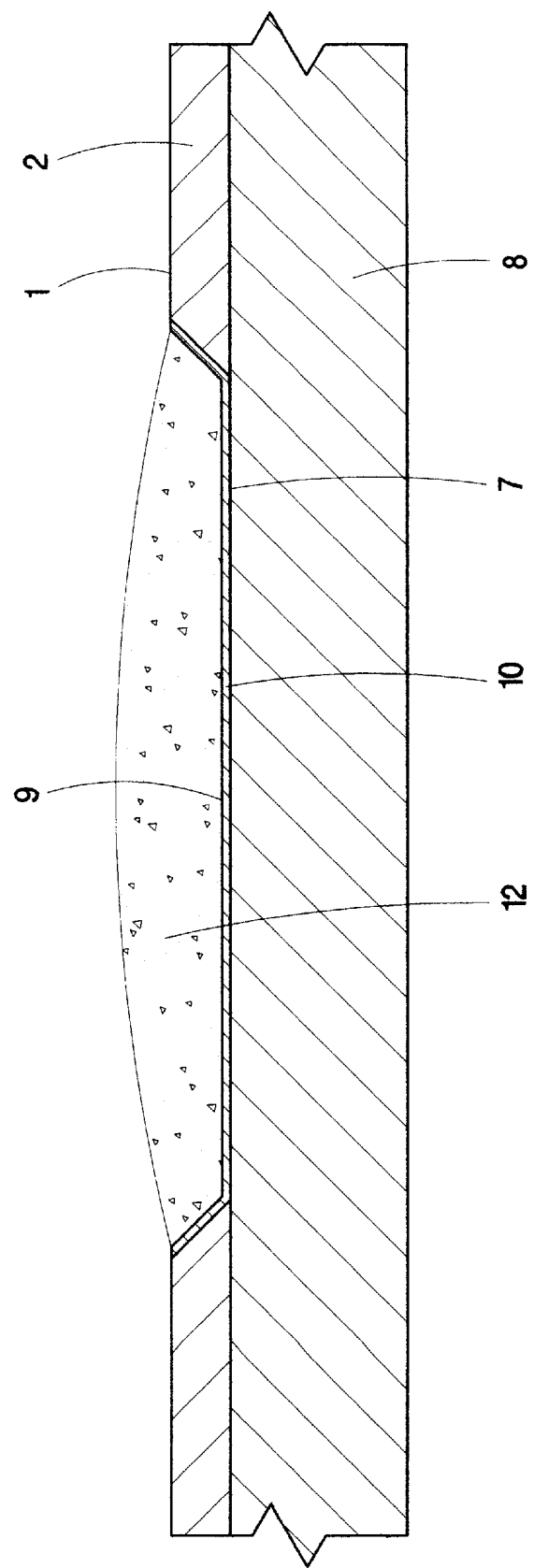
FIG. 4 redepicts FIG. 3 after the step of pouring filler material.

Referring simultaneously to FIGS. 3 and 4, prior to complete drying of the paint 10, a powdered filler material 12 is poured into the void. Preferably, the filler material 12 is non-reactive with cyanoacrylate ester adhesives and does not dissolve in such adhesives. A preferable filler material is powdered sodium bicarbonate. Suitable filler materials are powdered calcium carbonate, powdered silica, and powdered corn starch.

Figure 5:
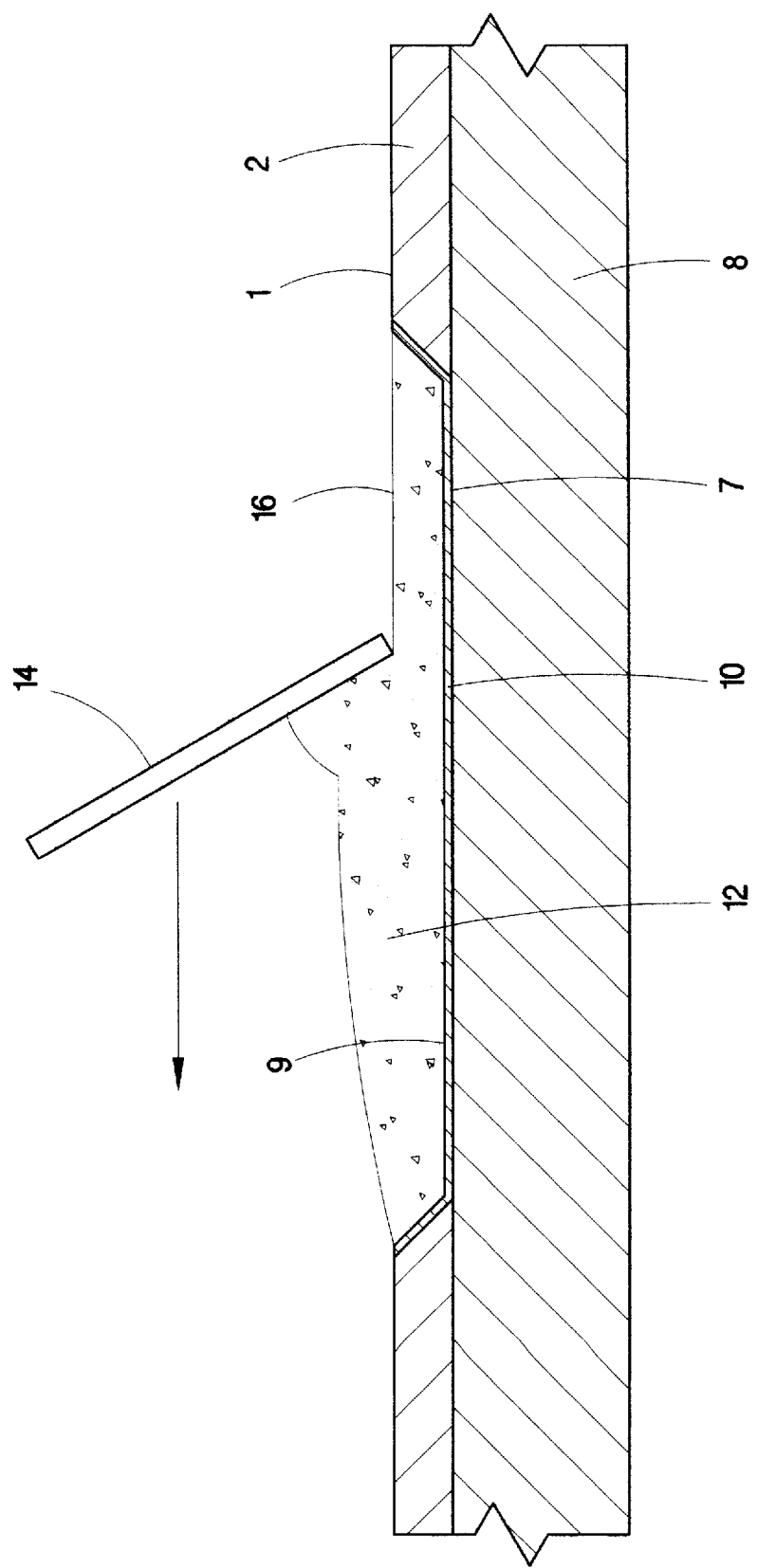
FIG. 5 redepicts FIG. 4 depicting a troweling step.

Referring to FIG. 5, after filler pouring step, a trowel 14 having a straight lower edge is utilized to trowel the filler material 12, forming an upper filler material surface 16 which is co-extensive with the upper surface 1 of the vinyl or linoleum stratum 2. Said troweling step is preferably performed prior to complete drying of the paint 10.

Figure 6:
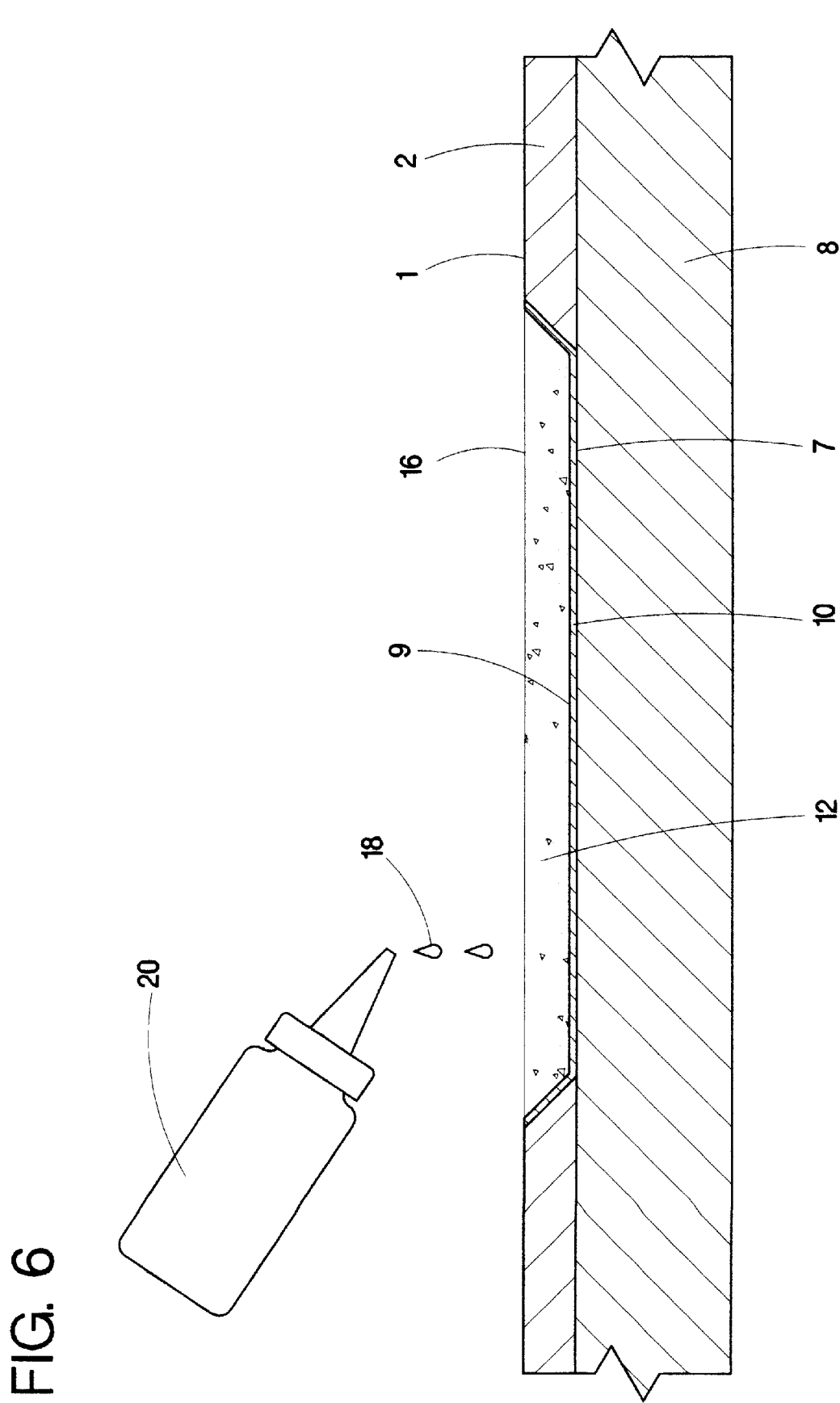
FIG. 6 redepicts FIG. 5 after completion of the troweling step and upon commencement of the adhesive introduction step.

Referring to FIG. 6, a cyanoacrylate ester adhesive 18, preferably methyl or ethyl based, is preferably dispensed from a squeeze bottle or tube 20 into the filler material 12, the dispensing of such adhesive continuing until the filler material 12 is saturated with such adhesive. Preferably, the adhesive dispensing step is performed prior to complete drying of the paint 10. Also preferably, the cyanoacrylate ester adhesive has a kinematic viscosity between 0.5 centistokes and 250 centistokes. Where viscosity of the adhesive exceeds 250 centistokes, percolation of the adhesive through the powder filler material ceases to occur, preventing saturation of the filler material.

Upon dispensing of the cyanoacrylate ester adhesive, water moisture from the paint 10 begins to react with the adhesive, hardening the adhesive. Typically, complete hardening occurs within ten to fifteen minutes. After such hardening occurs, it is preferable that the upper surface 16 of the filler material 12 be sanded with a fine grade of sandpaper to a smooth finish.

The hardened filler 12 typically is translucent allowing coloration of the upper surface 9 of the paint 10 to be viewed through the filler 12. Thus, the paint 9 prevents the patch from appearing as an unsightly darkened area.

While the principles of the inventive method have been made clear in the above illustrative embodiment, those skilled in the art may make modifications in the method steps and in the order of performance of steps of the invention without departing from those principles. Accordingly, it is intended that the description and drawings be interpreted as illustrative and not in the limiting sense, and that the invention be given a scope commensurate with the appended claims.

I claim:

1. A repair method for repairing a floor, the floor comprising a cover stratum and a base stratum, the cover stratum having an upper surface and a lower surface, the base stratum having an upper surface, the cover stratum having a damaged area, the damaged area comprising an aperture, the aperture having a side wall, an upper end, and a lower end, the aperture extending from the upper surface of the cover stratum to the lower surface of the cover stratum, the repair method comprising the steps of:

(a) painting a section of the upper surface of the base stratum, the section painted spanning across the lower end of the aperture;

(b) pouring filler into the aperture; and, (c) pouring adhesive into the filler.

2. The repair method of claim 1, wherein the step of pouring filler comprises selecting a material from the group consisting of sodium bicarbonate powder, calcium carbonate powder, silica powder, and corn starch powder.

3. The repair method of claim 1, wherein the step of pouring adhesive comprises selecting a liquid from the group consisting of methyl based cyanoacrylate ester adhesives and or ethyl based cyanoacrylate adhesives.

4. The method of claim 1, wherein the step of painting the section of the upper surface of the base stratum comprises selecting a liquid from the group consisting of light colored tempera paints, light colored latex paints, and light colored enamel paints.

5. The repair method of claim 4, further comprising the step of trimming the side wall of the aperture, such step being performed prior to the painting step.

6. The repair method of claim 5, further comprising the step of sanding the wall of the aperture, such step being performed prior to the painting step.

7. The repair method of claim 6, further comprising the step of troweling the filler to form an upper filler surface co-extensive with the upper surface of the cover stratum, such troweling step being performed prior to the step of pouring adhesive.

8. The repair method of claim 7, further comprising the step of drying the filler, such step being performed after the step of pouring adhesive.

9. The repair method of claim 8, further comprising the step of sanding the upper filler surface, such step being performed after the drying step.

10. The method of claim 1, wherein the step of painting the section of the upper surface of the base stratum comprises selecting a liquid from the group consisting of water based tempera paints, and water based latex paints.

11. The repair method of claim 10, further comprising the step of trimming the side wall of the aperture, such step being performed prior to the painting step.

12. The repair method of claim 11, further comprising the step of sanding the wall of the aperture, such step being performed prior to the painting step.

13. The repair method of claim 12, further comprising the step of troweling the filler to form an upper filler surface co-extensive with the upper surface of the cover stratum, such troweling step being performed prior to the step of pouring adhesive.

14. A repair method for repairing a floor, the floor comprising a cover stratum and a base stratum, the cover stratum having an upper surface and a lower surface, the base stratum having an upper surface, the upper stratum having a damaged area, the repair method comprising the steps of:

(a) cutting and removing a section of the cover stratum, such removed section of the cover stratum including the damaged area, such removal of such section forming an aperture having a side wall, an upper end, and a lower end, the aperture extending from the upper surface of the cover stratum to the lower surface of the cover stratum;

(b) painting a section of the upper surface of the base stratum, the section painted spanning across the lower end of the aperture;

(c) pouring filler into the aperture; and, (d) pouring adhesive into the aperture.

15. The repair method of claim 14, wherein the step of pouring filler comprises selecting a material from the group consisting of sodium bicarbonate powder, calcium carbonate powder, silica powder, and corn starch powder.

16. The repair method of claim 14, wherein the step of pouring adhesive comprises selecting a liquid from the group consisting of methyl based cyanoacrylate esters and ethyl based cyanoacrylate esters.

17. The method of claim 14, wherein the step of painting the section of the upper surface of the base stratum comprises selecting a liquid from the group consisting of light colored tempera paints, light colored latex paints, and light colored enamel paints.

18. The repair method of claim 17, further comprising the step of sanding the wall of the aperture, such step being performed prior to the painting step.

19. The repair method of claim 18, further comprising the step of troweling the filler to form an upper filler surface co-extensive with the upper surface of the cover stratum, such troweling step being performed prior to the step of pouring adhesive.

20. The method of claim 14, wherein the step of painting the section of the upper surface of the base stratum comprises selecting a liquid from the group consisting of water based tempera paints, and water based latex paints.

21. The repair method of claim 20, further comprising the step of trimming the side wall of the aperture, such step being performed prior to the painting step.

* * * * *